UNITED STATES PATENT OFFICE.

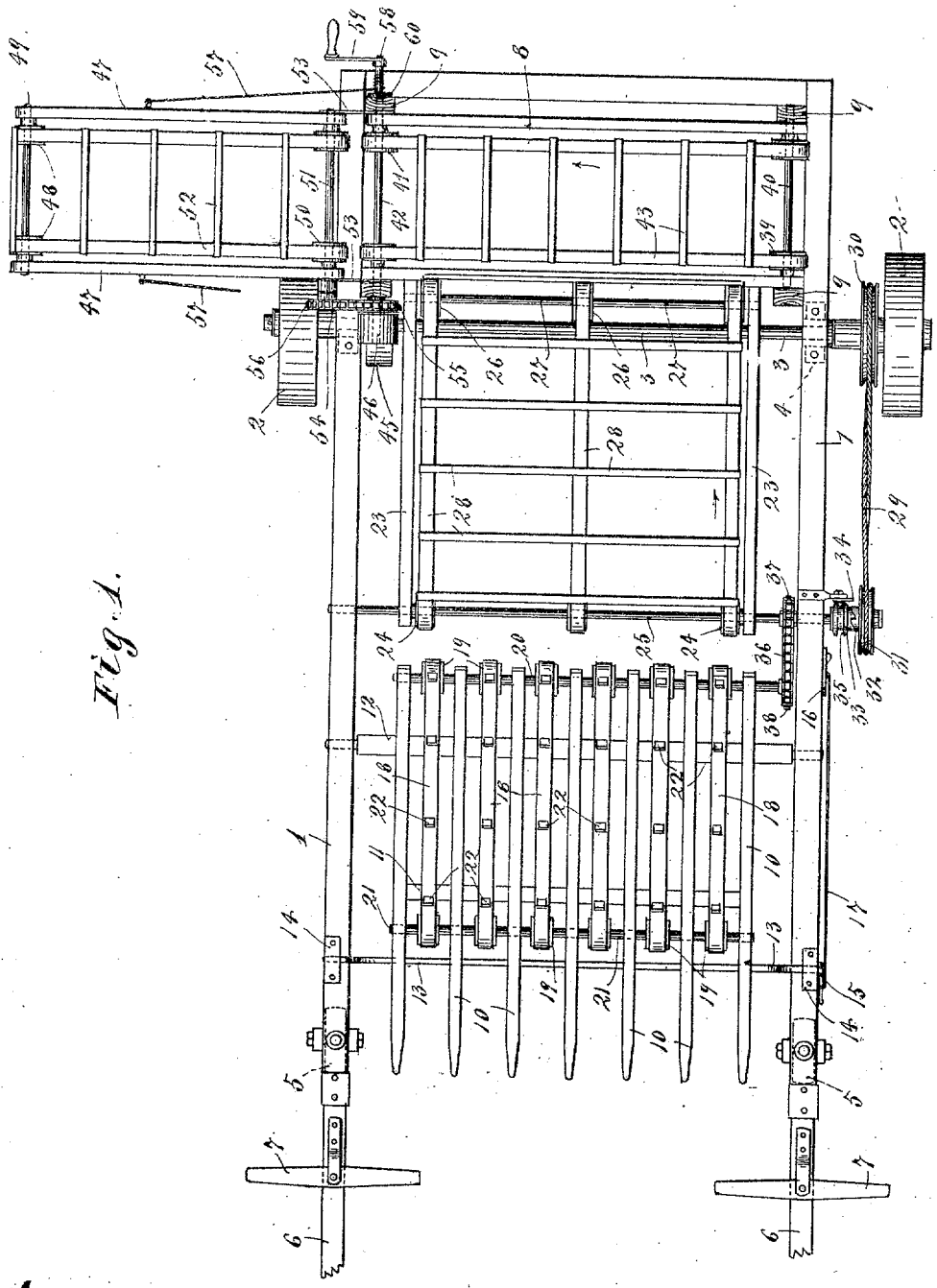

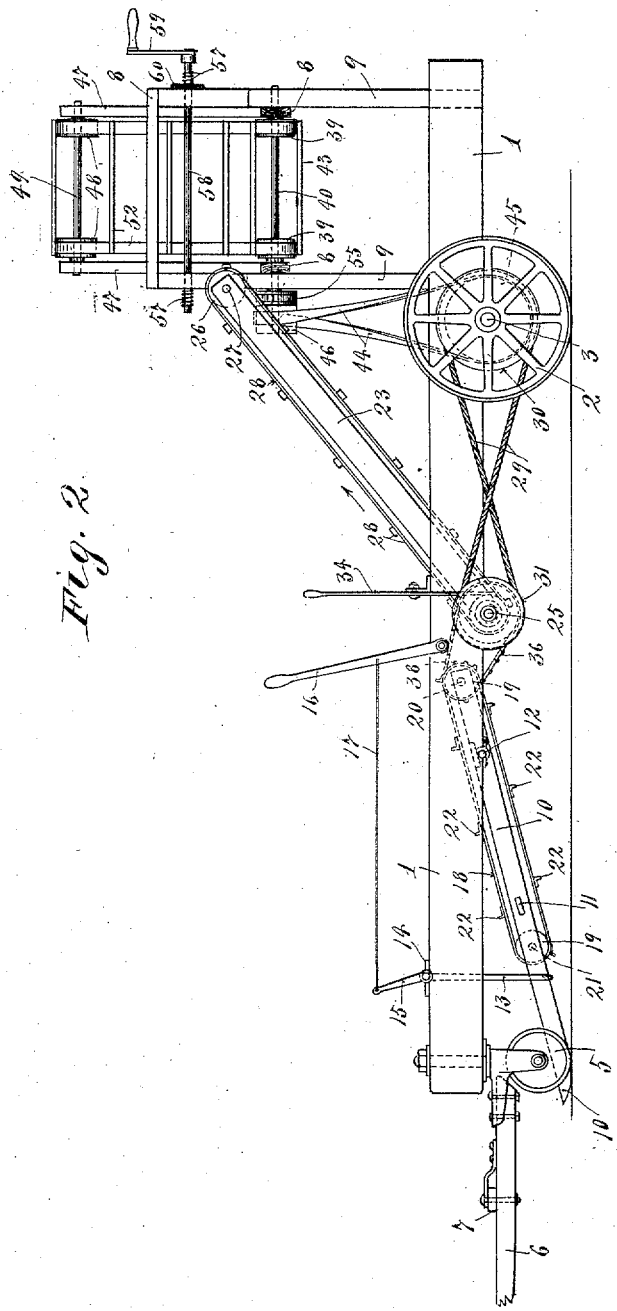

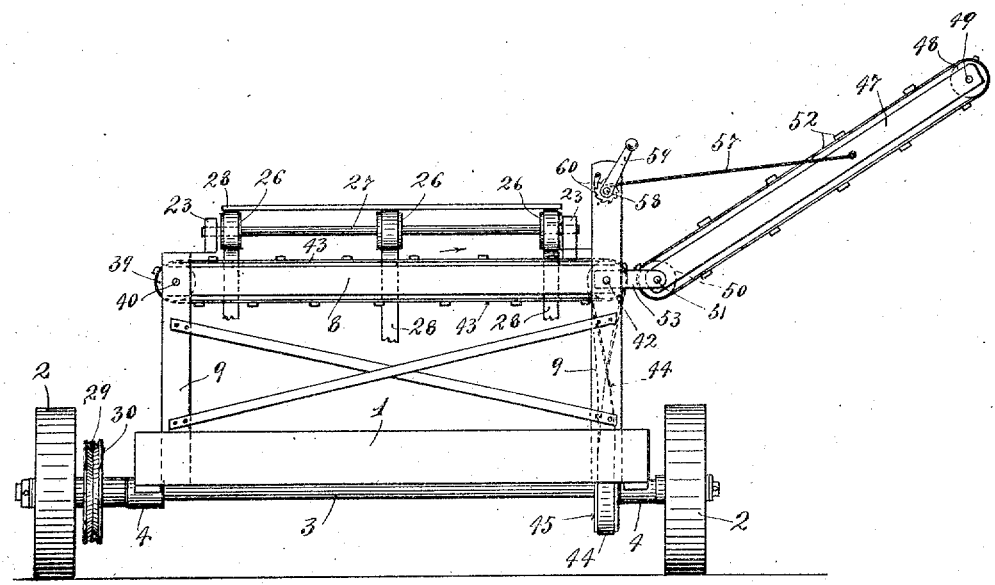

PETER S. SEVERIN, OF CROOKSTON, MINNESOTA.

LOADING-MACHINE.

No. 888,661.  Specification of Letters Patent.  Patented May 26, 1908.

Application filed June 19, 1907. Serial No. 379,697.

*To all whom it may concern:*

Be it known that I, PETER S. SEVERIN, a citizen of the United States, residing at Crookston, in the county of Polk and State of Minnesota, have invented certain new and useful Improvements in Loading-Machines; and I do hereby declare the following to be a full, clear, and exact description of the invention, such as will enable others skilled in the art to which it appertains to make and use the same.

My invention has for its object to provide a simple and efficient device for picking up shocks or bundles of grain, winnows or cocks of hay, and the like, and depositing the same in a suitable receptacle, such as a wagon drawn along by the side of a loading machine.

To the above ends, the invention consists of the novel devices and combinations of devices hereinafter described and defined in the claims.

In the accompanying drawings, which illustrate the invention, like characters indicate like parts throughout the several views.

Referring to the drawings: Figure 1 is a plan view of my improved loading machine, with some parts broken away. Fig. 2 is a view in side elevation, with some parts broken away; and Fig. 3 is a view in rear elevation.

The main frame 1 of the machine is U-shaped in form, and is supported at its rear portion by a pair of heavy wheels 2 mounted on an axle 3, which, in turn, is mounted in bearings 4 secured to the main frame 1. The front or open end of said main frame is supported by a pair of steering or caster wheels 5 to each of which is rigidly secured a draft device in the form of a pole 6, and a draft equalizer 7. A supplemental frame 8 is supported from and above said main frame 1 by uprights or posts 9. Mounted within the forward portion of said main frame 1 is a pick-up device in the form of laterally spaced toothed bars 10 that are connected together and spaced apart by a spacing bar 11 and a shaft 12. Said shaft 12 is passed through the rear portion of said bars 10, and its ends are mounted on the main frame 1 for pivotally supporting said pick-up device. The forward or toothed ends of said bars 10 normally rest upon the ground. To raise or lower the forward toothed ends of said bars 10, a bail 13 underlies said bars near their forward ends. The ends of the bail 13 are mounted in suitable bearings 14, secured to the main frame 1. One end of said bail 13 projects beyond the side of said main frame 1, and has secured thereto an arm 15 which, in turn, is connected by a link 17 to an operating lever 16 mounted on said main frame. Mounted on said pick-up device is an endless conveyer or elevator in the form of endless belts 18 adapted to run between and parallel with said bars 10, and over roller 19 mounted on shafts 20 and 21 carried by said toothed bars 10. In place of the ordinary slats, each belt 18 of the conveyer is provided with a series of short angle bars 22 spaced apart from one another and approximately of the same width as said belts 18. Arranged to receive from said pick-up device and conveyer carried thereby, is an endless inclined conveyer or elevator comprising a supporting frame 23, rollers 24, mounted on a shaft 25 which, in turn, is mounted on the main frame 1 and supports the lower end of said supporting frame 23. Rollers 26 mounted on a shaft 27 which, in turn, is mounted on the upper ends of said supporting frame 23, and an endless slat and belt conveyer 28, which runs over the rollers 24 and 26.

A rope drive 29 runs over a grooved pulley 30 secured to the hub of one of the wheels 2, and over a grooved sheave 31 loosely mounted on one end of the shaft 25 outside of the main frame 1. The hub of the sheave 31 is formed with a half clutch 32 adapted to be engaged by a sliding half clutch 33 mounted to slide on the shaft 25. A shipper lever 34, mounted on said main frame 1, has engagement with a groove 35 formed in the hub of the sliding half clutch 33, for the purpose of moving said half clutch 33 into and out of engagement with the half clutch 32 on the sheave 31. When the two half clutches 32—33 are in engagement, one with the other, the endless slat and belt conveyer 28 will be driven in the direction of the arrow marked on Fig. 1. A sprocket chain 36 runs over a sprocket wheel 37 carried by the shaft 20, and over a sprocket wheel 38 carried by the shaft 25, and drives the belt 18 of the pick-up device in the same direction as the conveyer 28.

A transverse endless conveyer is mounted on the supplemental frame 8. Said conveyer comprises rollers 39 carried by a shaft 40, rollers 41 carried by a shaft 42, which shafts 40 and 42 are mounted on said supplemental frame 8, and an endless slat and belt conveyer 43 running over the rollers 39 and 41. A belt 44 runs over a pulley 45 secured to the axle 3, and over a pulley 46 secured to the shaft 42, and drives said slat and belt conveyer 43 in the direction of the arrow marked on Fig. 1.

An endless conveyer or elevator, forming an extension of the transverse endless conveyer 43, is connected to the supplemental frame 8 for oscillatory movement in a vertical plane transversely of the main frame 1. Said endless conveyer or elevator comprises an oscillatory frame 47, rollers 48 carried by a shaft 49 mounted on the free end of said oscillatory frame 47, rollers 50 carried by a shaft 51 mounted on the other end of said oscillatory frame 47, and an endless slat and belt conveyer 52 running over the rollers 48 and 50. The ends of the shaft 51 project beyond the sides of said oscillatory frame 47 and are pivotally mounted in bearing straps 53 secured to the said supplemental frame 8. The endless slat and belt conveyer 52 is driven in the same direction as the endless slat and belt conveyer 43, by a chain 54, which chain runs over a sprocket 55 on the shaft 42, and over a sprocket 56 on the shaft 51. The free end of the oscillatory frame 47 is supported by a pair of hoisting cables 57 secured to the side of said frame 47 and to a windlass shaft 58. The windlass shaft 58 is provided with a crank 59 for operating said shaft. The shaft 58 may be held in any desired set position, by a pawl and ratchet device 60.

The machine above described may be used for picking up hay, or other materials, from the ground, and loading the same onto wagons.

What I claim is:—

1. In a loading machine, the combination with a frame and wheels supporting the same, of laterally spaced pick-up bars pivotally mounted in the forward portion of said frame, means for raising and lowering the free ends of said pick-up bars, power driven elevating devices working between said pick-up bars and terminating short of the free ends thereof, an endless slat and belt conveyer mounted on said frame and arranged to receive from said pick-up bars and elevating devices, and means for driving said conveyer, substantially as described.

2. In a loading machine, the combination with a main frame and wheels supporting the same, of a supplemental frame carried by said main frame, laterally spaced pick-up bars pivotally mounted on the forward portion of said main frame, means for raising and lowering the free ends of said pick-up bars, power driven elevating belts working between and terminating short of the free ends of said pick-up bars, a transverse endless slat and belt conveyer mounted on said supplemental frame, an intermediate endless slat and belt conveyer arranged to receive from said pick-up bars and said elevating devices, and to deliver to said transverse conveyer, and means for driving said intermediate and transverse conveyers, substantially as described.

3. In a loading machine, the combination with a main frame and wheels supporting the same, of a supplemental frame carried by said main frame, laterally spaced pick-up bars pivotally mounted on the forward portion of said main frame, a bail underlying the forward portion of said pick-up bars, the ends of said bail being pivotally mounted on said main frame, a lever for operating said bail for raising and lowering the free ends of said pick-up bars, elevating belts arranged to run between said pick-up bars and over power driven rollers carried thereby and terminating short of the free ends of said pick-up bars, a transverse endless slat and belt conveyer mounted on said supplemental frame, an intermediate slat and belt conveyer arranged to receive from said pick-up bars and elevating belts carried thereby and deliver to said transverse conveyer, and means for driving said intermediate and transverse conveyers, substantially as described.

4. In a loading machine, the combination with a frame, traction wheels supporting the rear portion of said frame and caster wheels supporting the forward portion of said frame, independent draft devices connected to said caster wheels, laterally spaced pick-up bars mounted in the forward portion of said frame, power driven elevating devices working between said pick-up bars, an endless slat and belt conveyer arranged to receive from said pick-up bars and said elevating devices, and means for driving said conveyer, substantially as described.

In testimony whereof I affix my signature in presence of two witnesses.

PETER S. SEVERIN.

Witnesses:
J. W. WHIPPLE,
P. MURRAY.